United States Patent
Ito et al.

(10) Patent No.: US 8,401,808 B2
(45) Date of Patent: Mar. 19, 2013

(54) WAVELENGTH-MULTIPLEXED OPTICAL SIGNAL MEASUREMENT DEVICE AND THE METHOD THEREOF

(75) Inventors: Fumihiko Ito, Tsukuba (JP); Keiji Okamoto, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 231 days.

(21) Appl. No.: 12/990,741

(22) PCT Filed: May 14, 2009

(86) PCT No.: PCT/JP2009/059010
§ 371 (c)(1),
(2), (4) Date: Nov. 2, 2010

(87) PCT Pub. No.: WO2009/145070
PCT Pub. Date: Dec. 3, 2009

(65) Prior Publication Data
US 2011/0077887 A1    Mar. 31, 2011

(30) Foreign Application Priority Data

May 30, 2008 (JP) ................................. 2008-143480

(51) Int. Cl.
*G06F 19/00* (2011.01)
(52) U.S. Cl. ........................................................ 702/77
(58) Field of Classification Search .................. 702/77
See application file for complete search history.

(56) References Cited

U.S. PATENT DOCUMENTS

| 2003/0030865 | A1 | 2/2003 | Yamada et al. | 359/124 |
| 2004/0071472 | A1 | 4/2004 | Ito | 398/161 |
| 2008/0165355 | A1* | 7/2008 | Yasui et al. | 356/323 |

FOREIGN PATENT DOCUMENTS

| CN | 1497247 A | 5/2004 |
| EP | 1408629 A2 | 4/2004 |

(Continued)

OTHER PUBLICATIONS

Okamoto, et al., "Simultaneous WDM signal detection realized by ultrafast field sampling," Optics Express, Apr. 13, 2009, vol. 17, No. 8, pp. 6696-6702.

(Continued)

*Primary Examiner* — Tung S Lau
(74) *Attorney, Agent, or Firm* — Ohlandt, Greeley, Ruggiero, and Perle, L.L.P.

(57) ABSTRACT

Light to be measured L and sampling pulse light $L_{SP}$ are each split into M beams, and a time delay of 0, T, 2T, ..., (M−1)T is given to each of the M-split sampling pulse light beams. The M-split light beams to be measured are then respectively multiplexed with M optical 90-degree hybrids, and M electrical field amplitudes per time T are determined for the light beam to be measured, based on M sets of output currents received at a balance light receiving element that receives light emitted from each of the optical 90-degree hybrids. The amplitudes of the respective wavelength optical signals contained in the light beam to be measured are calculated through Fourier transformations of the field electrical amplitudes. Pulsed light with a spectral width that covers the total frequency bandwidth of the light to be measured is used as the sampling pulse light. Where the total frequency bandwidth of the light to be measured is $\Delta f_{total}$, and the frequency interval of the optical signals contained in the light to be measured is $\Delta f$, $T \leq 1/\Delta f_{total}$ and $1/(MT) \leq \Delta f$ are set.

10 Claims, 5 Drawing Sheets

FOREIGN PATENT DOCUMENTS

| | | |
|---|---|---|
| JP | 3053294 | 4/2000 |
| JP | 2003-051810 A | 2/2003 |
| JP | 2004132719 A | 4/2004 |
| JP | 2005-069845 A | 3/2005 |
| JP | 3808820 | 5/2006 |

OTHER PUBLICATIONS

Okamoto, et al., "Simultaneous WDM Signal Detection Realized by Ultrafast Field Sampling," which was material for presentation at ECOC 2008, held by the Convention of National Societies of Electrical Engineers of Europe (EUREL) in Brussels, Belgium, Sep. 21-25, 2008, consisting of 1 page.

Okamoto, et al., "Simultaneous WDM Signal Detection Realized by Ultrafast Field Sampling", research paper B-10-81 at the 2008 IEICE Communications Society Conference held on Sep. 16-19, 2008, pp. 224 (with English translation).

Okamoto, et al., "Relatively Delayed Dual-channel Interferometric sampling for Observing Ultrafast Amplitude and Phase (Frequency) Modulation," Proceedings of the IEICE Conference, Sep. 7, 2006, vol. 2006 Society B2 pp. 83-84 (with English translation).

Okamoto, et al., "Simultaneous WDM Signal Detection realized by Ultrafast Field Sampling," IEICE Technical Report, 2009, vol. 108, No. 395, pp. 11-16 (with English abstract).

Okamoto, et al., "Channel-allocation-adaptive WDM signal observation based on sequential ultrafast field sampling," Optics Letters, May 1, 2010, vol. 35, No. 9, pp. 1410-1412.

International Search Report dated Aug. 18, 2009 for corresponding PCT/JP2009/059010.

English translation of Written Opinion of the International Searching Authority dated Aug. 18, 2009 for corresponding International Patent Application No. PCT/JP2009/059010.

English translation of International Preliminary Report on Patentability dated Jan. 20, 2011 for corresponding International Patent Application No. PCT/JP2009/059010.

* cited by examiner

WAVELENGTH-MULTIPLEXED OPTICAL SIGNAL MEASUREMENT DEVICE AND THE METHOD THEREOF

TECHNICAL FIELD

The present invention relates to a measurement device and method for measuring the signal waveform at each wavelength of a wavelength-multiplexed optical signal.

BACKGROUND ART

Conventionally, to measure the amplitude of a wavelength-multiplexed optical signal, the optical signal to be measured is normally split into optical signals of the respective wavelengths by a wavelength separation device, and the amplitude is then measured based on the signal waveforms of the respective wavelengths by a measurement device. The wavelength separation device may be a multilayer film optical filter or a diffraction grating disclosed in Patent Document 1. However, in a case where wavelength intervals are set in a dense manner as in dense wavelength-multiplexed optical communications, to accurately perform a wavelength separation, the physical locations and temperatures of those elements need to be controlled with extremely high precision.

CITATION LIST

Patent Documents

Patent Document 1: Japanese Patent Publication No. 3053294
Patent Document 2: Japanese Patent Publication No. 3808820

Non-Patent Documents

Although the following non-Patent Documents were issued after the application (Japanese Patent Application No. 2008-143480) on which this application is based was filed, techniques related to the present invention are disclosed in those literatures.
Non-Patent Document 1: Keiji Okamoto and Fumihiko Ito, "Simultaneous WDM signal detection realized by ultrafast field sampling", Optics Express, Vol. 17, Issue 8, p.p. 6696-6702, published Apr. 13, 2009.
Non-Patent Document 2: A material for presentation at ECOC 2008, which was held by the Convention of National Societies of Electrical Engineers of Europe (EUREL) in Brussels, Belgium, Sep. 21-25, 2008: Keiji Okamoto and Fumihiko Ito, "Simultaneous WDM Signal Detection Realized by Ultrafast Field Sampling"
Non-Patent Document 3: A research paper at the 2008 IEICE Communications Society Conference held on Sep. 16-19, 2008: Keiji Okamoto and Fumihiko Ito, "Simultaneous WDM Signal Detection Realized by Ultrafast Field Sampling"

DISCLOSURE OF THE INVENTION

Problem to be Solved by the Invention

As described above, to measure the signal amplitude at each wavelength of a conventional wavelength-multiplexed optical signal, the optical signal to be measured is split into optical signals of the respective wavelengths, and the optical signals of the respective wavelengths are extracted. The signal waveform of each of the optical signals is then measured. Therefore, in the case of optical signals having dense wavelength intervals, a high-precision wavelength separation device is required. Furthermore, the elements in the wavelength separation device need to be controlled with high precision, resulting in problems in costs and management.

The present invention has been made in view of the above circumstances, and an object thereof is to provide a wavelength-multiplexed optical signal measurement device and the method thereof by which the signal amplitude at each wavelength of a wavelength-multiplexed optical signal can be measured without performing a wavelength separation, and optical signals having dense wavelength intervals can be processed.

Means for Solving the Problem

To achieve the above object, a wavelength-multiplexed optical signal measurement device according to the present invention has the following structure.

(1) The wavelength-multiplexed optical signal measurement device includes: a sequentially sampled electrical field sampling unit that measures the total electrical field amplitude of a wavelength-multiplexed optical signal; and a sequentially sampled electrical field analyzing unit that applies Fourier analysis to the result of the measurement carried out by the sequentially sampled electrical field sampling unit, and calculates the electrical field amplitude of the signal component of each wavelength, the sequentially sampled electrical field sampling unit measuring the total electrical field amplitude $J_m$ of the wavelength-multiplexed optical signal M times at intervals of time T (provided that, where the total bandwidth of the wavelength-multiplexed optical signal is $\Delta f_{total}$, the time T is set shorter than $1/\Delta f$ and the inverse number $1/(MT)$ of the total observation time is set smaller than the frequency interval $\Delta f$ of adjacent wavelength channels), the sequentially sampled electrical field analyzing unit calculating the amplitude of the signal of each wavelength by determining a series of Fourier transformations of the total electrical field amplitude $J_m (0 \leq m \leq M-1)$ determined by the sequentially sampled electrical field sampling unit.

(2) In the structure of (1), the sequentially sampled electrical field sampling unit includes: a light generating unit that generates sampling pulse light that has a spectral width larger than the total bandwidth $\Delta f_{total}$ of total of the wavelength-multiplexed optical signal, and has a spectral center substantially matching the center wavelength of the entire wavelength-multiplexed optical signal light; a splitting unit that M-splits the sampling pulse light and the wavelength-multiplexed optical signal light; a delay unit that gives a time delay of an integral multiple of the time T in one of a path of the M-split sampling pulse light and a path of the wavelength-multiplexed optical signal light; M optical 90-degree hybrids that multiplex the sampling pulse light and the wavelength-multiplexed optical signal light at each split output after the splitting and delaying, and form signal light beams with phases separated 90 degrees from one another; M balance light receivers that receive light beams emitted from the M optical 90-degree hybrids, and obtain orthogonal currents $I_m$ and $Q_m$ ($0 \leq m \leq M-1$); and a computing unit that measures the values of the respective output currents $I_m$ and $Q_m$ of the M balance light receivers at arbitrary time, and determines the total electrical field amplitude $J_m$ of the wavelength-multiplexed optical signal light according to $J_m = I_m + jQ_m$.

(3) In the structure of (2), when an error exists in the delay amount generated by the delay unit, the sequentially sampled electrical field sampling unit sets an electrical field amplitude obtained by observing a single wavelength of a constant amplitude beforehand as:

$J_m^{(0)}(0 \leq m \leq M-1)$, and sets the total electrical field amplitude of the wavelength-multiplexed optical signal as:

$J_m(0 \leq m \leq M-1)$, with the total electrical field amplitude of the wavelength-multiplexed optical signal being regarded as:

$K_m = J_m J_m^{(0)*}$ (* representing a phase conjugate).

(4) In the structure of (2) or (3), the light generating unit repetitively generates the sampling pulse light, and detunes its generation frequency slightly from a part of the bit frequency divided by an integer.

A wavelength-multiplexed optical signal measurement method according to the present invention is implemented to carry out by the following procedures.

(5) The wavelength-multiplexed optical signal measurement method is designed for calculating the electrical field amplitude of the signal component of each wavelength by measuring the total electrical field amplitude of a wavelength-multiplexed optical signal and applying Fourier analysis to the result of the measurement, and includes the following procedures: measuring the total electrical field amplitude $J_m$ of the wavelength-multiplexed optical signal M times at intervals of time T (provided that, where the total bandwidth of the wavelength-multiplexed optical signal is $\Delta f_{total}$ the time T is set shorter than $1/\Delta f_{total}$, and the inverse number $1/(MT)$ of the total observation time is set smaller than the frequency interval $\Delta f$ of adjacent wavelength channels), and applying Fourier analysis to the total electrical field amplitude $J_m$ ($0 \leq m \leq M-1$), to calculate the amplitude of the signal of each wavelength.

(6) In the procedure of (5), the measurement of the total electrical field amplitude of the wavelength-multiplexed optical signal includes: generating sampling pulse light for the wavelength-multiplexed optical signal, the sampling pulse light having a spectral width larger than the total bandwidth $\Delta f_{total}$ of the wavelength-multiplexed optical signal, the sampling pulse light having a spectral center substantially matching the center wavelength of the entire wavelength-multiplexed optical signal light; M-splitting the sampling pulse light and the wavelength-multiplexed optical signal; giving a time delay of an integral multiple of the time T in one of the path of the M-split sampling pulse light and the path of the wavelength-multiplexed optical signal; multiplexing the sampling pulse light and the wavelength-multiplexed optical signal at each split output after the splitting and delaying, and forming a pair of signal light beams with phases separated 90 degrees from each another; obtaining orthogonal currents $I_m$ and $Q_m$ ($0 \leq m \leq M-1$) of the pair of signal light beams; and measuring the values of the orthogonal currents $I_m$ and $Q_m$ at arbitrary time, and determining the total electrical field amplitude $J_m$ of the wavelength-multiplexed optical signal according to $J_m = I_m + jQ_m$.

(7) In the procedure of (6), the measurement of the total electrical field amplitude of the wavelength-multiplexed optical signal includes: when an error exists in a delay amount generated by the delay unit, setting an electrical field amplitude obtained by observing a single wavelength of a constant amplitude beforehand as:

$J_m^{(0)}(0 \leq m \leq M-1)$;

and setting the total electrical field amplitude of the wavelength-multiplexed optical signal as:

$J_m(0 \leq m \leq M-1)$, with the total electrical field amplitude of the wavelength-multiplexed optical signal being regarded as:

$K_m = J_m J_m^{(0)*}$ (* representing a phase conjugate).

(8) In the procedures of (6) or (7), the sampling pulse light is repetitively generated, and its generation frequency is detuned slightly from a part of the bit frequency divided by an integer.

As described above, the wavelength-multiplexed optical signal measurement device and the method thereof having the above structure are characterized by measuring the total electrical field waveform of a wavelength-multiplexed optical signal with an ultrafast sequentially sampled electrical field sampling unit, and applying Fourier analysis to the measurement result, to calculate the electrical field waveforms of optical signals of the respective wavelengths.

Effect of the Invention

As described above, the present invention can provide a wavelength-multiplexed optical signal measurement device and the method thereof by which the signal amplitude at each wavelength of a wavelength-multiplexed optical signal can be measured without performing a wavelength separation, and optical signals having dense wavelength intervals can be processed.

BEST MODE FOR CARRYING OUT THE INVENTION

The following is a description of embodiments of the present invention, with reference to the accompanying drawings.

Figure 1:
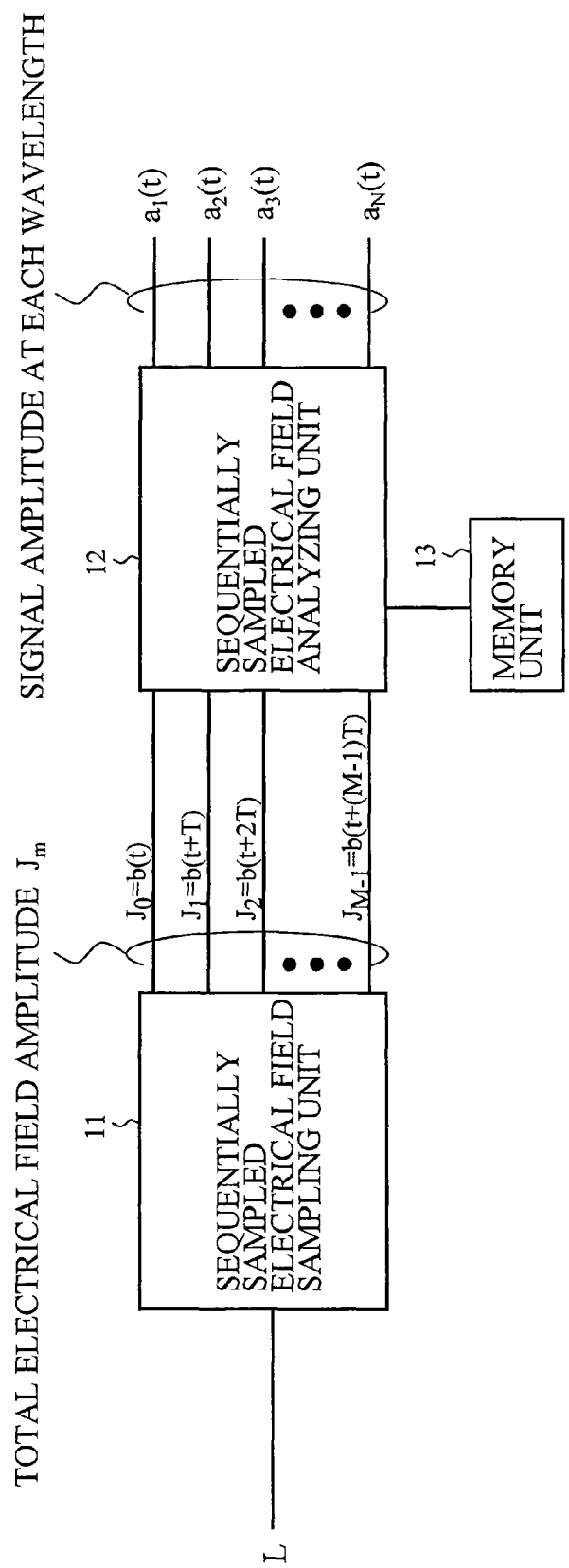
FIG. 1 is a block diagram showing the structure of an embodiment of a measurement device that uses a wavelength-multiplexed optical signal waveform measurement method according to the present invention.
Figure 2:
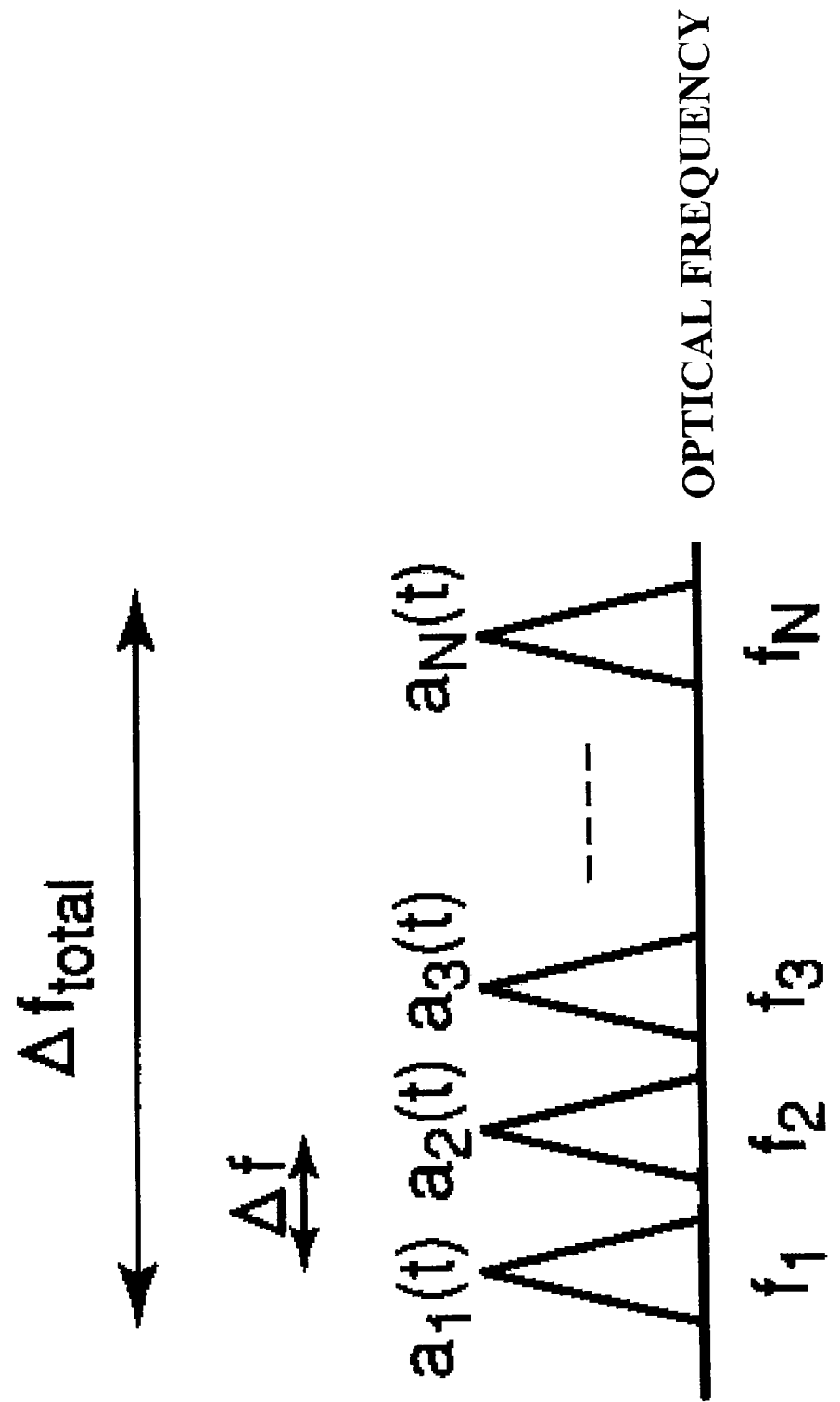
FIG. 2 is a drawing for explaining a wavelength-multiplexed signal that is the optical signal to be measured in the embodiment illustrated in FIG. 1.

FIG. 1 is a block diagram showing the structure of an embodiment of a measurement device that uses a wavelength-multiplexed optical signal measurement method according to the present invention. In FIG. 1, L represents a wavelength-multiplexed optical signal that is to be an optical signal to be measured. The wavelength-multiplexed optical signal L is formed by literally modulating light beams of wavelengths with different signals, and multiplexing those signals. The frequency of the light beam of each wavelength is denoted by $f_i$ ($i=1, 2, \ldots, N$). Where the modulated signal corresponding to the frequency is represented by $a_i(t)$, the electrical field of a wavelength signal is expressed as:

$a_i(t) \exp j2\pi f_i t$ [Equation 1]

In the equation, $a_i(t)$ is a complex number. Where the electrical field of a wavelength-multiplexed optical signal is b(t), the electrical field of the entire signal is the sum of the electrical fields of the respective wavelength signals, and can be expressed as:

[Equation 2]

$$b(t) = \sum_{i=1}^{N} a_i(t)\exp j2\pi f_i t \qquad (1)$$

This electrical field b(t) is a complex number that reflects the amplitude and phase of the electrical field, and varies extremely rapidly with time. The minimum variation cycle is substantially equal to the inverse number of the bandwidth $\Delta f_{total}$ of total of the entire wavelength-multiplexed optical signal. For example, in the case of a wavelength-multiplexed optical signal multiplexed at frequency intervals of 100 GHz, $\Delta f_{total}$ is equal to 1 THz, and therefore, b(t) varies within the time of approximately 1 ps.

The optical signal to be measured L (=b(t)) is guided to a sequentially sampled electrical field sampling unit 11. This sequentially sampled electrical field sampling unit 11 measures the electrical field amplitude of measured optical signal L at M times at intervals of time T. In other words, the sequentially sampled electrical field sampling unit 11 measures b(t), b(t+T), b(t+2T), ..., and b(t+(M−1)T).

Here, it is necessary to set T smaller than $1/\Delta f_{total}$. This is based on a sampling theorem, and only where the condition is satisfied, b(t) can be completely determined from the measured data string: b(t), b(t+T), b(t+2T), ..., and b(t+(M−1)T). Here, b(t) is a complex number, and has a real part and a imaginary part. Therefore, the number of pieces of data obtained through this measurement process is 2M.

The inverse number 1/(MT) of the total observation time also needs to be set smaller than the frequency interval Δf in the wavelength channels. As will be described later, 1/(MT) defines the smallest splittable frequency intervals when a wavelength-multiplexed optical signal is split according to the present invention.

Measuring the amplitude of a wavelength-multiplexed optical signal is not possible in terms of speed by a conventional method involving a light receiving element, but can be realized by the following method.

Figure 3:
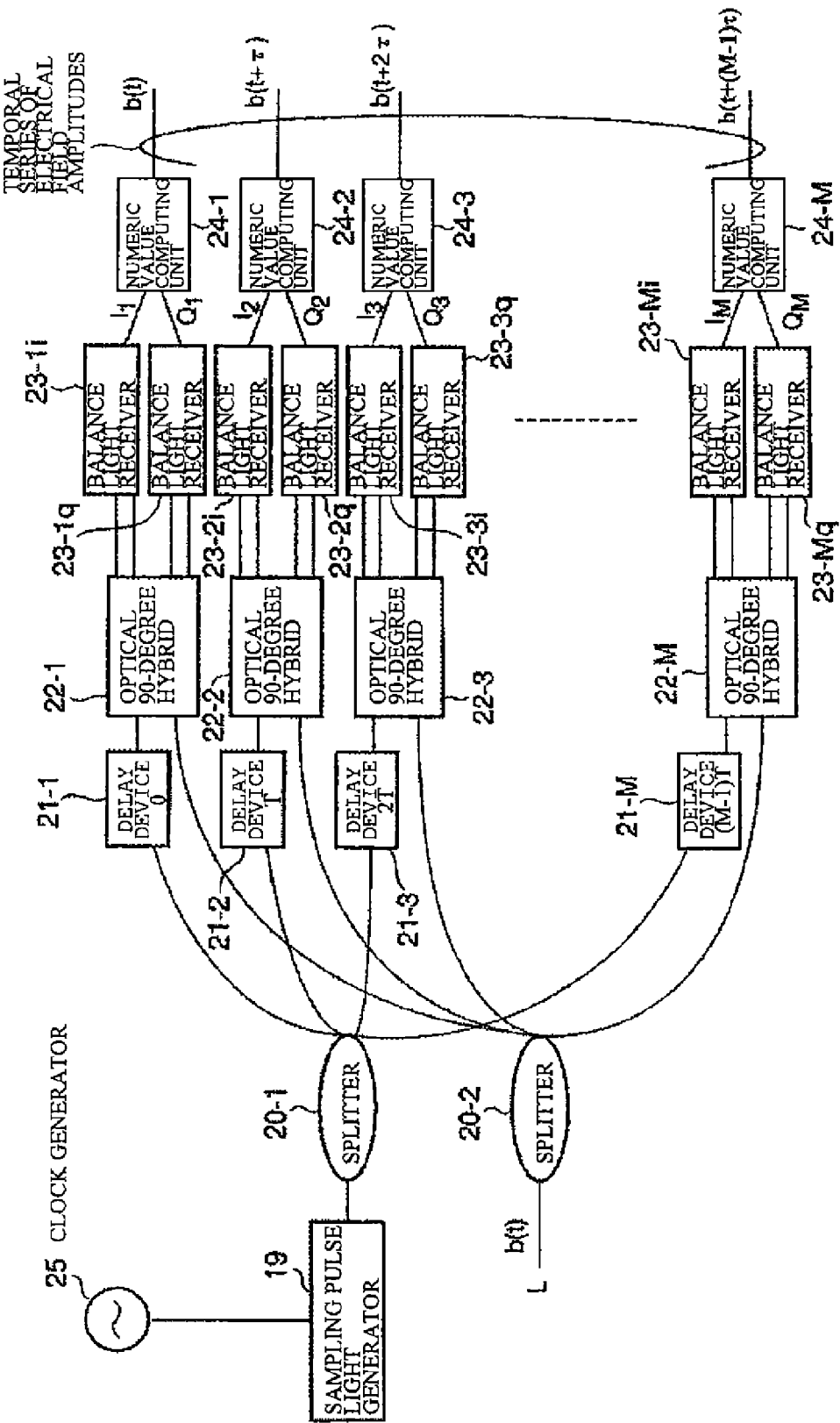
FIG. 3 is a block diagram showing the structure of a sequentially sampled electrical field sampling unit in the embodiment illustrated in FIG. 1.

FIG. 3 is a block diagram showing a specific structure of the above described sequentially sampled electrical field sampling unit 11. In FIG. 3, reference numeral 19 indicates a sampling pulse generator. Sampling pulse light $L_{SP}$ generated here is split into M lines by a splitter 20-1, and is supplied to one end of the input terminals of each of optical 90-degree hybrids 22-1 through 22-M via delay devices 21-1 through 21-M. Meanwhile, the optical signal to be measured L that is wavelength-multiplexed is split into M lines by a splitter 20-2, and is supplied to the other end of the input terminals of each of the optical 90-degree hybrids 22-1 through 22-M.

The delay devices 21-1 through 21-M each provide a time delay of an integral multiple of T such as 0, T, 2T, ..., (M−1)T in the path of split sampling pulse light, and may be placed in the split output path of the optical signal to be measured L.

Figure 4:
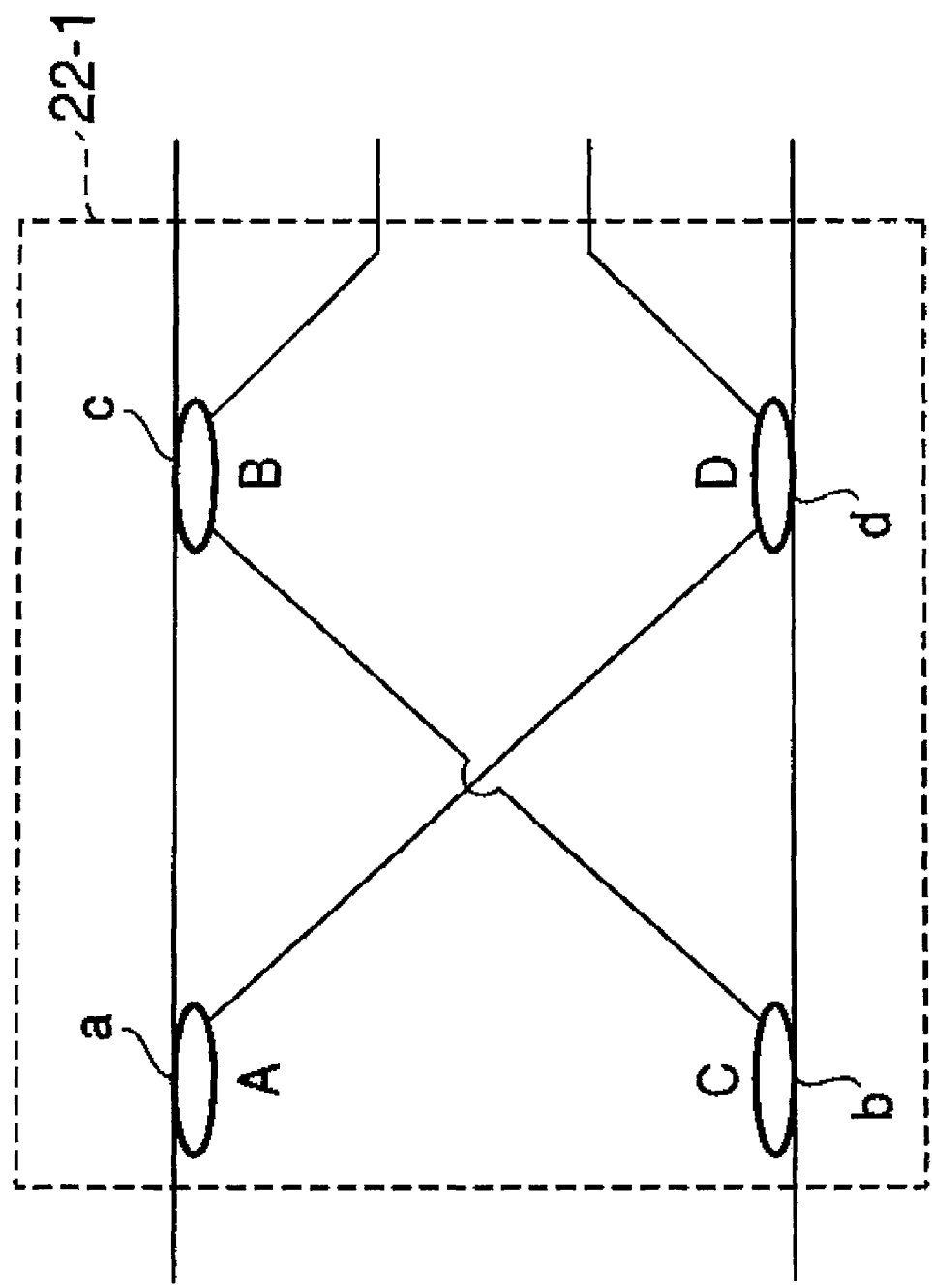
FIG. 4 is a block diagram showing a specific structure of an optical 90-degree hybrid illustrated in FIG. 3.

The optical 90-degree hybrids 22-1 through 22-M are each formed with optical couplers a, b, c, and d, as shown in FIG. 4. The difference between optical paths AB and AD in the drawing is set larger or smaller than the difference between optical paths CB and CD by λ/4 (λ is a light wavelength).

The pairs of optical signals obtained at the optical 90-degree hybrids 22-1 through 22-M are received by balanced light receiving elements 23-1$_i$ through 23-M$_i$ and 23-1$_q$ through 23-M$_q$, and are converted into electrical signals $I_1$ through $I_M$ and $Q_1$ through $Q_M$. The converted signals are transmitted to numeric value computing units 24-1 through 24-M by the line.

All the wavelength channels for wavelength-multiplexed optical signals operate at bit rates (Bbps) that are synchronous with the same clock. Therefore, in the optical sampling unit 11 illustrated in FIG. 3, a clock generator 25 sets the clock slightly detuned from a part of a signal bit rate divided by an integer (approximately 1/10 through 1/1000, for example). More specifically, where $F_c$ represents the clock frequency, $$F_C = B/N + \Delta F \qquad \text{[Equation 3]}$$

Here, ΔF represents detuned frequency. According to this clock, the sampling pulse light generating unit 19 generates the sampling pulse light $L_{SP}$.

The sequentially sampled electrical field sampling unit 11 having the above described structure is realized by applying the light sampling method and device disclosed in Patent Document 2. Patent Document 2 discloses a technique related to a light sampling method for observing locally-fast signal light that is repetitively input. By the technique, the intensity modulation and frequency modulator in an optical signal are observed where one of the following conditions is satisfied: a first condition is that a light pulse generating unit generates sampling pulse light having a light pulse width shorter than the inverse number of the frequency variation of the signal light, and the intensity of the signal light hardly varies within the time of the pulse width of the sampling pulse light; a second condition is that the frequency of the optical signal to be measured L hardly varies within the time of the pulse width of the sampling pulse light $L_{SP}$; and a third condition is that the center frequency of the sampling pulse light $L_{SP}$ is substantially equal to the center frequency of the signal light. Accordingly, the electrical field amplitude of the optical signal can be determined from this intensity modulation and frequency modulator.

When the above first through third conditions are applied to the wavelength-multiplexed optical signal L (=b(t)), the first and second conditions mean that the pulse width of the sampling pulse light $L_{SP}$ needs to be shorter than the variation time of the wavelength-multiplexed optical signal b(t) (the inverse number of $\Delta f_{total}$). This is equivalent to the spectral width of the sampling pulse light $L_{SP}$ being larger than $\Delta f_{total}$.

The third condition means that the center frequency of the sampling pulse light $L_{SP}$ substantially matches the center wavelength of the entire wavelength-multiplexed optical signal. To sum up those three conditions, the spectral width of the sampling pulse light $L_{SP}$ to be used for sampling needs to cover the entire spectrum of the entire wavelength-multiplexed optical signal to be observed.

For ease of explanation hereafter, the electrical field waveform Sam(t) of the sampling pulse light is set as:

[Equation 4]

$$Sam(t) = \delta(t)\exp j(2\pi f_S t + \phi_S) \qquad (2)$$

Here, δ(t) is a delta function that has an intensity only in the vicinity of t=0, and is zero in the other regions, and the sampling pulse light has an extremely short pulse width. Accordingly, this approximation can be performed. Further, $f_s$ represents the center frequency of the sampling pulse light, and $\phi_s$ represents the initial phase of the sampling pulse light, the reference of which is the signal light. For simplification, the amplitude of the sampling pulse light is standardized, and will be hereinafter expressed as follows including the phase:

[Equation 5]

$$Sam = \exp j\phi_S \quad (3)$$

When the sampling pulse light is incident on the optical 90-degree hybrids 22-1 through 22-M, the delay devices 21-1 through 21-M give the delays of 0, T, 2T, . . . , and (M−1)T, respectively. Accordingly, where t=t$_0$ is set as the time at which the sampling pulse light reaches the first optical 90-degree hybrid 22-1, the amplitude Sam$_m$ of the sampling pulse light incident on the mth optical 90-degree hybrid 22-$m$ can be expressed as:

[Equation 6]

$$Sam_m = \exp j(2\pi m f_S T + \phi_S) \quad (4)$$

Also, the amplitude $b_m (0 \leq m \leq M-1)$ of the wavelength-multiplexed optical signal at the time 0, T, 2T, . . . , and (M−1)T at which the split sampling pulse light is incident on the respective optical 90-degree hybrids 22-1 through 22-M is expressed as:

[Equation 7]

$$b_m = \sum_{i=1}^{N} a_i(mT) \exp j 2\pi m f_i T \quad (5)$$

Here, bm=b(t+mT).

The output light beams from the optical 90-degree hybrids 22-1 through 22-M are connected to the light receiving elements 23-1$_i$ through 23-M$_i$ of the in-phase channel, and the light receiving elements 23-1$_q$ through 23-M$_q$ of the quadrature channel, and photocurrents I$_1$ through I$_M$ of the in-phase channel and photocurrents Q$_1$ through Q$_M$ of the quadrature channel are induced. The sizes of those photocurrents are expressed as:

[Equation 8]

$$I_m = R[b_m Sam^*_m]$$

$$Q_m = T[b_m Sam^*_m] \quad (6)$$

Here, R and T represent a real part and an imaginary part, respectively. Also, * represents the phase conjugate. Where the equations (4) and (5) are substituted into the equation (6), and J$_m$=I$_m$+jQ$_m$, the following equation is established:

[Equation 9]

$$J_m = \sum_{i=1}^{N} a_i(mT) \exp[j2\pi m(f_i - f_S)T - \phi_S] \quad (0 \leq m \leq M-1) \quad (7)$$

For simplification, a case where the amplitude $a_i(mT)$ of each wavelength channel hardly varies during time MT is now described. Here, the spectral width of each channel is smaller than the frequency interval Δf between the channels, and this is true with respect to regular wavelength-multiplexed optical signals. In that case, the equation (7) is transformed into

[Equation 10]

$$J_m \cong \sum_{i=1}^{N} a_i(0) \exp[j2\pi m(f_i - f_S)T - \phi_S] \quad (8)$$

$$= b_m \exp[-j(2\pi m f_S T + \phi_S)]$$

$$(0 \leq m \leq M-1)$$

where $J_m = I_m + jQ_m$ is proportional to the electrical field amplitude b(t) at time t=0.

In view of the above, the total electrical field amplitude J$_m$ is in a Fourier transformation relationship with the amplitude $a_i(0)$ of each wavelength-multiplexed optical signal. Accordingly, the amplitude $a_i(0)$ of each wavelength channel can be determined by performing a Fourier inverse transforming operation on the total electrical field amplitude J$_m$. In other words, to determine the amplitude $a_i(0)$, the following calculation should be performed:

[Equation 11]

$$a_i(0) = \sum_{m=0}^{M-1} J_m \exp[j2\pi m(f_i - f_S)T - \phi_S] \quad (9)$$

Because of the fundamental properties of a Fourier transformation, the following relationship should be established to sufficiently separate the channels:

[Equation 12]

$$2\pi M(f_i - f_{i-1})T = 2\pi M \Delta f T \geq 2\pi \quad (10)$$

Therefore, Δf should be equal to or larger than 1/(MT), and the adjacent frequency interval Δf=f$_i$-f$_{i-1}$ should be larger by as much as 1/(MT).

The numeric value computing units 24-1 through 24-M shown in FIG. 3 calculate the total electrical field amplitude J$_m$, according to J$_m$≡I$_m$+jQ$_m$, which is based on the currents I$_m$ and Q$_m$ from the light receiving elements 23-$m_i$ and 23-$m_q$. A sequentially sampled electrical field analyzing unit 12 calculates the signal amplitude $a_i(0)$ of each wavelength channel from the total electrical field amplitude J$_m$, based on the equation (10).

Figure 5:
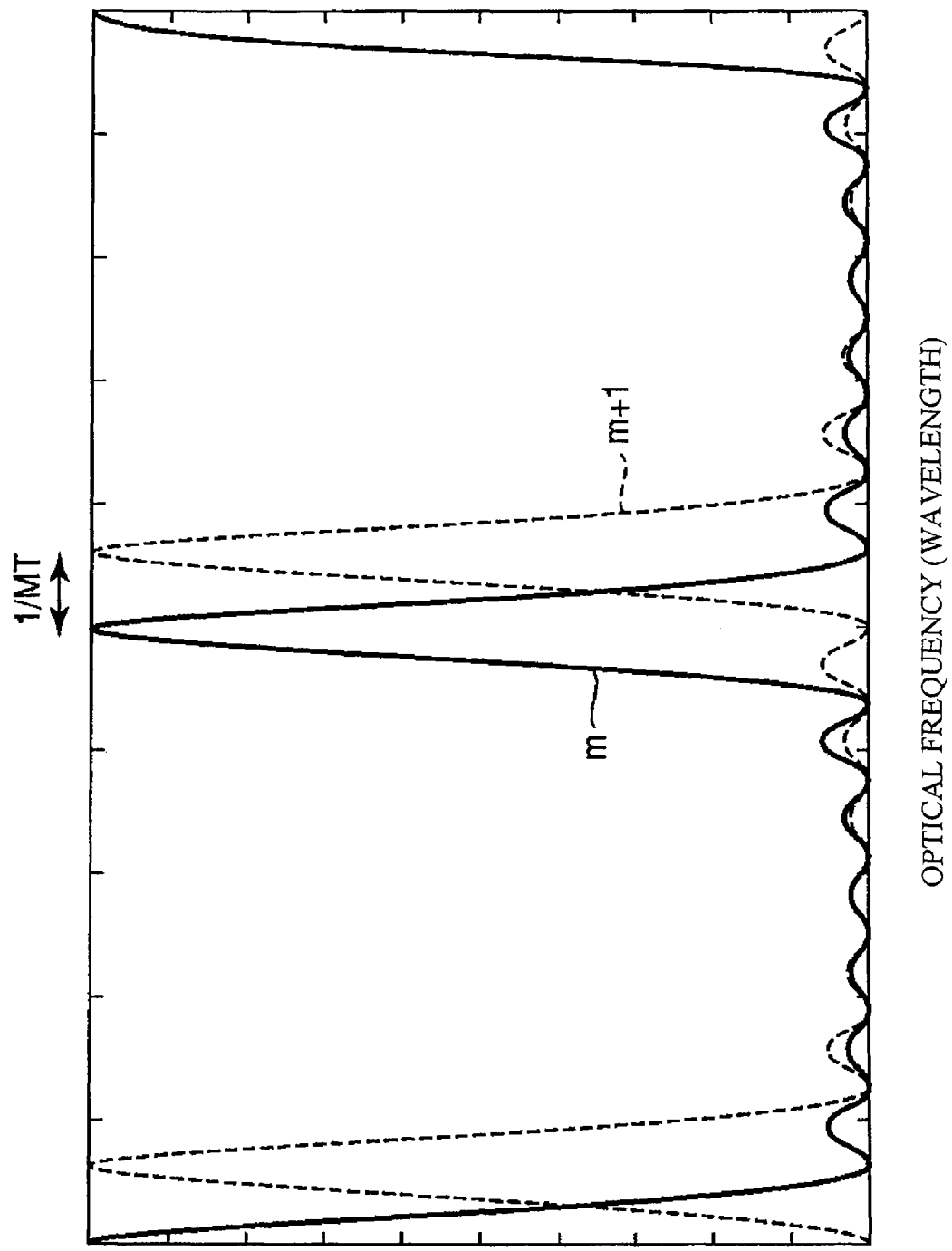
FIG. 5 is a waveform chart for explaining the sinc function used in the above embodiment.

Here, the filter to be realized by performing a Fourier transformation can be substantially approximated by a sinc function (sin(x)/x) as shown in FIG. 5, and has a transmission width of approximately 1/(MT) and has a zero point every 1/(2MT). Accordingly, where the adjacent channel interval Δf is larger than 1/(MT), signals of the respective channels can be separated. When the adjacent channel interval Δf is equal to 1/(MT), the crosstalk can be minimized, as the center frequency of the adjacent channel is located at a zero point of the filter. The center frequency of the filter of each channel can be adjusted by varying f$_i$ in the equation (9).

In the explanation made so far, each delay time to be given by the delay devices 21-1 through 21-M is assumed to be exactly an integral multiple of T. However, in embodying the present invention, it is necessary to take into consideration the fact that there might be a variation in the delay time.

Here, a case where the time delays T$_0$ through T$_{M-1}$ to be realized by the delay devices 21-1 through 21-M in FIG. 3 are set as follows:

[Equation 13]

$$T_m = mT + \Delta T_m \quad (0 \leq m \leq M-1) \quad (11)$$

Here, $\Delta T_m$ is a deviation from an ideal value of each delay. At this point, the equation (8) can be transformed into

[Equation 14]

$$J_m \cong \sum_{i=1}^{N} a_i(0)\exp[j2\pi m(f_i - f_S)T - \phi_S] \cdot \exp(-j2\pi m f_S \Delta T_m) \quad (12)$$

Since a coefficient $\exp(-j2\pi m f_s \Delta T_m)$ is generated by the deviation from the ideal delay value, the correct $a_i(0)$ cannot be obtained by applying Fourier analysis to that.

In such a case, the coefficient $\exp(-j2\pi m f_s \Delta T_m)$ is measured beforehand by the unit described below, and is corrected through a numeric value computing operation. Specifically, in the structure illustrated in FIG. 1, only a single wavelength light beam of constant amplitude is observed. If $a_1(0)$ is measured, $J_m^{(0)}$ to be output is expressed as follows:

[Equation 15]

$$J_m^{(0)} = a_1^{(0)}\exp[j2\pi m(f_1-f_S)T-\phi_S]\exp(-j2\pi m f_S \Delta T_m) \quad (13)$$

The sequentially sampled electrical field analyzing unit 12 stores $J_m^{(0)}$ of the equation 15 obtained at a certain point of time into a memory unit 13. The sequentially sampled electrical field analyzing unit 12 extracts $J_m^{(0)}$ from the memory unit 13 at the time of the calculation described below.

$$K_m \equiv J_m J_m^{(0)*} \quad \text{[Equation 16]}$$

Where the above is defined, the following is obtained from the equations (12) and (13):

[Equation 17]

$$K_m \cong \sum_{i=1}^{N} a_i(0)\exp[j2\pi m(f_i - f_1)T] \quad (14)$$

Accordingly,

[Equation 18]

$$a_i(0) \cong \sum_{m=0}^{M-1} K_m \exp[j2\pi m(f_i - f_1)T] \quad (15)$$

$a_i(0)$ can be determined by the above Fourier analysis.

As is apparent from the above explanation, according to this embodiment, the amplitude of each wavelength channel can be detected at the single time t=0. Specifically, as shown in FIG. 3, sampling pulse light is repetitively generated by the clock generator 25, and its generation frequency is slightly detuned from a part of the bit frequency divided by an integer. In this manner, the signal waveform (amplitude) at anytime can be observed according to the principles of sampling oscilloscope.

As described above, according to the present invention, a wavelength-multiplexed optical signal can be observed by an entirely novel technique. The present invention enables an observation of a wavelength-multiplexed optical signal by an unconventional method by which Fourier analysis is numerically applied to a signal obtained by observing the total electrical field amplitude of the wavelength-multiplexed optical signal with an ultrafast observing unit. Accordingly, a wavelength-multiplexed optical signal can be observed without the use of an optical wavelength filter that is normally troublesome to be controlled.

The present invention is not limited to the above described embodiment, but modifications may be made to the components in the embodying stage without departing from the scope of the invention. Also, various inventions can be made by arbitrarily combining two or more of the components disclosed in the above described embodiment. For example, some of the components described in the embodiment may be deleted. Further, components disclosed in different embodiments may be arbitrarily combined.

EXPLANATION OF REFERENCE NUMERALS 11 sequentially sampled electrical field sampling unit
12 sequentially sampled electrical field analyzing unit
19 sampling pulse generator
20-1, 20-2 splitters
21-1 through 21-M delay devices
22-1 through 22-M optical 90-degree hybrids
a, b, c, d optical couplers
23-1$_i$ through 23-M$_i$, 23-1$_q$ through 23-M$_q$ balance light receiving elements
24-1 through 24-M numeric value computing units
25 clock generator

What is claimed is:

1. A wavelength-multiplexed optical signal measurement device comprising:
   a sequentially sampled electrical field sampling unit that measures a total electrical field amplitude of a wavelength-multiplexed optical signal; and
   a sequentially sampled electrical field analyzing unit that applies Fourier analysis to a result of the measurement carried out by the sequentially sampled electrical field sampling unit, and calculates an electrical field amplitude of a signal component of each wavelength,
   the sequentially sampled electrical field sampling unit measuring the total electrical field amplitude $J_m$ of the wavelength-multiplexed optical signal M times at intervals of time T, where a total bandwidth of the wavelength-multiplexed optical signal is $\Delta f_{total}$, the time T is set shorter than $1/\Delta f_{total}$, and the inverse number 1/(MT) of a total observation time is set smaller than a frequency interval $\Delta f$ of an adjacent wavelength channel,
   the sequentially sampled electrical field analyzing unit calculating an amplitude of a signal of each wavelength by determining a series of Fourier transformations of the total electrical field amplitude $J_m$ ($0 \leq m \leq M-1$) determined by the sequentially sampled electrical field sampling unit.

2. The wavelength-multiplexed optical signal measurement device according to claim 1, wherein
   the sequentially sampled electrical field sampling unit includes:
   a light generating unit that generates sampling pulse light that has a spectral width larger than the total bandwidth $\Delta f_{total}$ of the wavelength-multiplexed optical signal, and has a spectral center substantially matching a center wavelength of the entire wavelength-multiplexed optical signal light;
   a splitting unit that M-splits the sampling pulse light and the wavelength-multiplexed optical signal light;
   a delay unit that gives a time delay of an integral multiple of the time T in one of a path of the M-split sampling pulse light and a path of the wavelength-multiplexed optical signal light;

M optical 90-degree hybrids that multiplex the sampling pulse light and the wavelength-multiplexed optical signal light at each split output after the splitting and delaying, and form signal light beams with phases separated 90 degrees from one another;

M balance light receivers that receive light beams emitted from the M optical 90-degree hybrids, and obtain orthogonal currents $I_m$ and $Q_m$ ($0 \leq m \leq M-1$); and a computing unit that measures values of the output currents $I_m$ and $Q_m$ of the M balance receivers at an arbitrary time, and determines the total electrical field amplitude $J_m$ of the wavelength-multiplexed optical signal light according to $J_m = I_m + jQ_m$.

3. The wavelength-multiplexed optical signal measurement device according to claim 2, wherein when an error exists in a delay amount generated by the delay unit, the sequentially sampled electrical field sampling unit sets an electrical field amplitude obtained by observing a single wavelength of a constant amplitude beforehand as:

$$J_m^{(0)} \ (0 \leq m \leq M-1),$$

and sets the total electrical field amplitude of the wavelength-multiplexed optical signal as:

$$J_m \ (0 \leq m \leq M-1),$$

with the total electrical field amplitude of the wavelength-multiplexed optical signal being regarded as:

$$K_m = J_m J_m^{(0)*} \ (\text{* representing a phase conjugate}).$$

4. The wavelength-multiplexed optical signal measurement device according to claim 2, wherein the light generating unit repetitively generates the sampling pulse light, and detunes a generation frequency thereof slightly from a part of a bit frequency divided by an integer.

5. The wavelength-multiplexed optical signal measurement device according to claim 3, wherein the light generating unit repetitively generates the sampling pulse light, and detunes a generation frequency thereof slightly from a part of a bit frequency divided by an integer.

6. A wavelength-multiplexed optical signal measurement method for calculating an electrical field amplitude of a signal component of each wavelength by measuring a total electrical field amplitude of a wavelength-multiplexed optical signal and applying Fourier analysis to a result of the measurement, the method comprising measuring the total electrical field amplitude $J_m$ of the wavelength-multiplexed optical signal M times at intervals of time T, where a total bandwidth of the wavelength-multiplexed optical signal is $\Delta f_{total}$, the time T is set shorter than $1/\Delta f_{total}$, and the inverse number $1/(MT)$ of a total observation time is set smaller than a frequency interval $\Delta f$ an adjacent wavelength channel, and applying Fourier analysis to the total electrical field amplitude $J_m$ ($0 \leq m \leq M-1$), to calculate the amplitude of the signal of each wavelength.

7. The wavelength-multiplexed optical signal measurement method according to claim 6, wherein the measurement of the total electrical field amplitude of the wavelength-multiplexed optical signal includes:

generating sampling pulse light for the wavelength-multiplexed optical signal, the sampling pulse light having a spectral width larger than the total bandwidth $\Delta f_{total}$ of the wavelength-multiplexed optical signal, the sampling pulse light having a spectral center substantially matching a center wavelength of the entire wavelength-multiplexed optical signal light;

M-splitting the sampling pulse light and the wavelength-multiplexed optical signal;

giving a time delay of an integral multiple of the time T in one of a path of the M-split sampling pulse light and a path of the wavelength-multiplexed optical signal;

multiplexing the sampling pulse light and the wavelength-multiplexed optical signal at each split output after the splitting and delaying, and forming a pair of signal light beams with phases separated 90 degrees from each another;

obtaining orthogonal currents $I_m$ and $Q_m$ ($0 \leq m \leq M-1$) of the pair of signal light beams; and measuring values of the orthogonal currents $I_m$ and $Q_m$ at arbitrary time, and determining the total electrical field amplitude $J_m$ of the wavelength-multiplexed optical signal according to $J_m = I_m + jQ_m$.

8. The wavelength-multiplexed optical signal measurement method according to claim 7, wherein the measurement of the total electrical field amplitude of the wavelength-multiplexed optical signal includes:

when an error exists in a delay amount generated by the time delay, setting an electrical field amplitude obtained by observing a single wavelength of a constant amplitude beforehand as:

$$J_m^{(0)} \ (0 \leq m \leq M-1)$$

and setting the total electrical field amplitude of the wavelength-multiplexed optical signal as:

$$J_m \ (0 \leq m \leq M-1),$$

with the total electrical field amplitude of the wavelength-multiplexed optical signal being regarded as:

$$K_m = J_m J_m^{(0)*} \ (\text{* representing a phase conjugate}).$$

9. The wavelength-multiplexed optical signal measurement method according to claim 7, wherein the sampling pulse light is repetitively generated, and a generation frequency thereof is detuned slightly from a part of a bit frequency divided by an integer.

10. The wavelength-multiplexed optical signal measurement method according to claim 8, wherein the sampling pulse light is repetitively generated, and a generation frequency thereof is detuned slightly from a part of a bit frequency divided by an integer.

* * * * *